May 20, 1969        F. MOSS        3,445,161

OPTICAL PROJECTOR FOR REPROPORTIONING IMAGES

Filed Nov. 12, 1965        Sheet _1_ of 2

INVENTOR.
FRANKLIN MOSS
BY
ATTORNEY

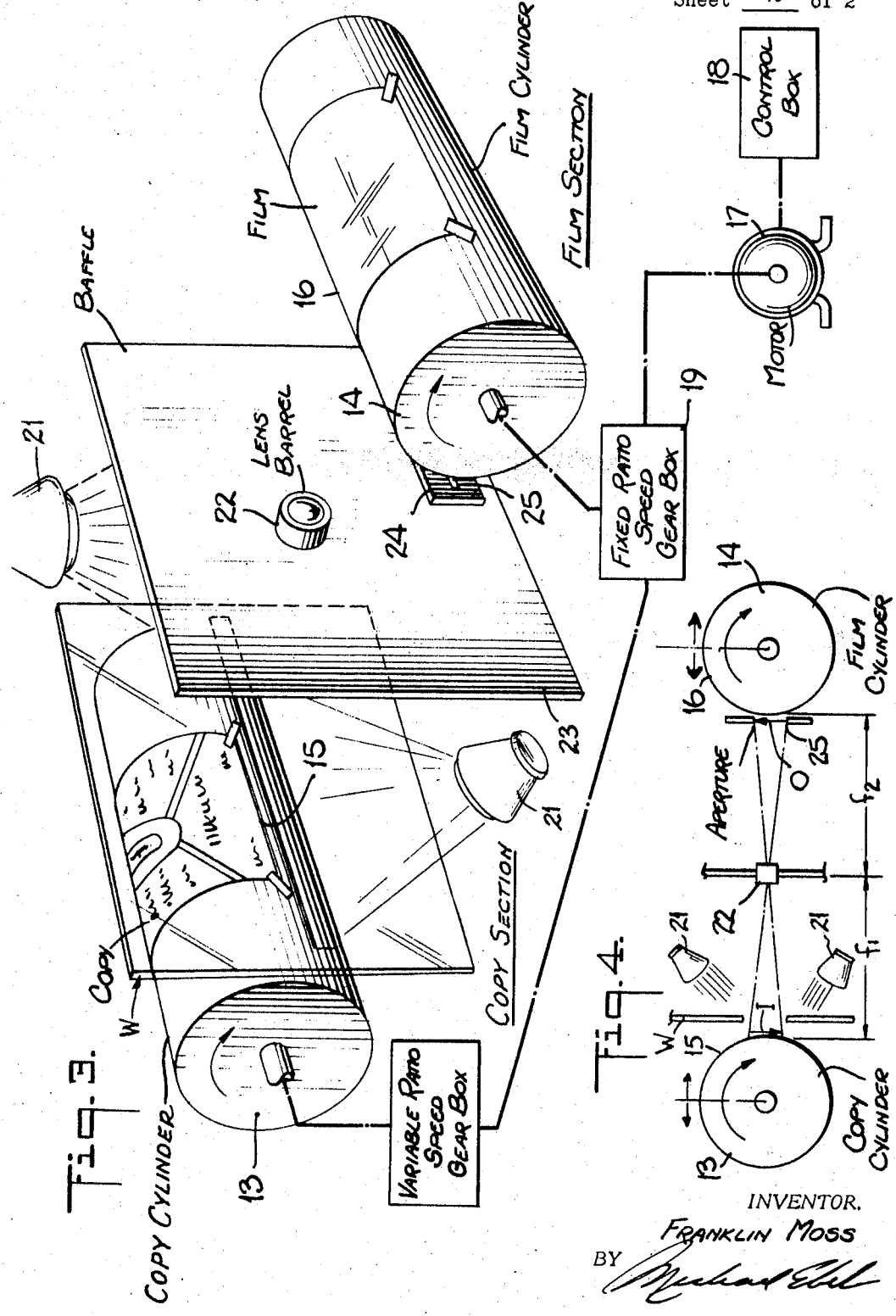

3,445,161
OPTICAL PROJECTOR FOR REPROPORTIONING IMAGES
Franklin Moss, Ridgewood, N.J., assignor to Mosstype Corporation, Waldwick, N.J., a corporation of New York
Filed Nov. 12, 1965, Ser. No. 507,433
Int. Cl. G03b 27/58
U.S. Cl. 355—47                    10 Claims

ABSTRACT OF THE DISCLOSURE

An optical projector adapted to alter the ratio of lateral-to-longitudinal dimensions in a negative film derived from a copy such as an original drawing. The copy and the sensitive film are mounted on separate rotating cylinders in an arrangement in which an illuminated image of the copy is projected onto the surface of the film through a linear aperture aligned with the longitudinal axes of the cylinders. As the cylinders rotate, the aperture is effectively drawn across the sensitive film to expose same, the resultant degree of reproportioning depending on the relative circumferential speeds of the cylinders.

---

This invention relates generally to optical projectors adapted to introduce distortion into a photographic negative to alter the ratio of the lateral-to-longitudinal dimensions of an original image reproduced thereby, and more particularly to a projector useful in flexography for photographically reproportioning copy to compensate for shrinkage or elongation in the rubber plate made therefrom.

Flexography is a rotary printing method involving rubber printing plates and fast-drying inks. The rubber plates are mounted on a plate cylinder which cooperates with an impression cylinder, the paper, foil or other material to be printed running therebetween. In fabricating a rubber printing plate, the first step is the preparation of a copy, which is an artist's original drawing of the design to be printed.

This design must then be etched into the surface of a metal plate by photoengraving. This is accomplished by making a photographic negative of the copy, the negative being placed in direct contact with a coated metal plate, such as a zinc plate, which is exposed to actinic rays through the negative, the coating on the metal being rendered acid-soluble only in those areas on which the light impinges. The design is then engraved in the metal by a system of acid etching so that the original drawing becomes a bas-relief in metal. This engraved plate or cut is the master pattern from which the rubber plate is eventually made.

Since the rubber printing plate must duplicate the design contained in the engraving, it cannot be molded directly therein, for the rubber would then constitute a negative image. It becomes necessary, therefore, to mold the rubber plate in a matrix which has already been molded from the engraving. The matrix is formed from a sheet of thermosetting plastic which is first heated in contact with the engraving to soften it and to cause it to assume the design in the engraving, the matrix sheet being maintained under pressure to allow the plastic to polymerize.

The procedure for molding the rubber plate in the matrix is similar to that used in molding the matrix from the engraving, a rubber sheet being first softened by the application of heat and then squeezed and held under pressure until it conforms to the matrix. Thereafter, the rubber plate is stripped from the mold and allowed to cool.

Ideally, the pattern in the rubber plate, when mounted on the plate cylinder, is an exact facsimile of the original copy. In practice, however, this is not the case, for factors come into play causing shrinkage or elongation of the printing plate, with a resultant disparity between the pattern on the printing plate and that on the original copy. Rubber plates tend to shrink in the lateral and the longitudinal directions when they are taken from the mold and cooled. On the other hand, when a rubber plate is mounted on a plate cylinder or when it is curved, an elongation takes place in the rubber. The degree of elongation per inch of copy depends not only on the tightness of the curve (the smaller the cylinder circumference, the greater the elongation), but also on the amount or thickness of the rubber plate.

Thus, in the direction going around the plate cylinder, there are two factors acting on the finished printing size; namely, the molding shrinkage of the rubber as governed by the type of rubber and type of plate, and elongation of the rubber as governed by cylinder circumference and thickness of plate.

In order, therefore, to compensate for elongation or shrinkage, the original drawings must be made shorter or longer than expected to print. In conventional practice, it is necessary to calculate the compensation factors for the copy or to determine these factors empirically by molding a test plate. When dealing with complicated art layouts, the need for compensation makes the artist's work much more painstaking and time-consuming.

With a view to making it possible for the artist to draw his work in the exact printing size, attempts have heretofore been made to reproportion uncompensated copy by means of so-called "distortion" cameras. In one form of a distortion camera, the copy board and the film board are tilted relative to each other to lengthen or shorten at least one dimension of the image. The drawback to such arrangements lies in the fact that it is difficult to maintain the image of the entire copy in proper focus, for parts of the inclined image may lie outside of the focal plane of the lens. Moreover, the exposure of the film tends to be uneven with a resultant under or overexposure of particular areas and a loss of copy. Also, difficulty is experienced in such cameras when varying one dimension of the image, to maintain the other dimension constant.

In another form of distortion camera, special lenses are used to distort the image. But such cameras have limited practical value in flexography, for different lenses must be employed to obtain different degrees of distorting. Also such lenses give rise to undesirable "barrelling" of the image.

Accordingly, it is the main object of this invention to provide an optical projector of simple and efficient design which is adapted to alter the ratio of lateral-to-longitudinal dimensions in a negative derived from a copy.

More specifically, it is an object of the invention to provide an optical projector in which the copy and sensitive film are mounted on separate rotating cylinders in an arrangement wherein the illuminated image of the copy is projected onto the surface of the film through a linear aperture aligned with the longitudinal axes of the cylinders, whereby as the cylinders rotate, the aperture is in effect, drawn across the sensitive film to expose same, the degree of reproportioning introduced therein depending on the relative circumferential speeds of the cylinders.

Also an object of the invention is to provide an optical projector for reproportioning images which is readily and accurately adjustable to obtain the desired ratio of lateral-to-longitudinal dimensions in the reproduced image.

Still another object of the invention is to provide an optical projector wherein both the absolute speeds of the cylinders and the relative speeds thereof are adjustable to vary not only the degree of reproportioning, but also the effective shutter speed or exposure time.

Briefly stated, these objects are accomplished in a distorting optical projector adapted to reproportion images, the projector being constituted by two rotatable cylinders of like circumference disposed in parallel relationship, a copy being mounted on one cylinder and a sensitive film on the other, the illuminated image of the copy being projected onto the film through a lens disposed between the cylinders and a focal-plane aperture curtain disposed in front of the film cylinder, variable-speed means being provided to rotate both cylinders whereby the aperture is, in effect, drawn across the sensitive film to expose same to the moving image of the copy in a manner resulting in expansion or shrinkage of the image on the film, depending on the relative speeds of the cylinder. The size of the image in the direction across the film may also be adjusted by varying the positions of the cylinders relative to each other.

A significant advantage of the invention, as applied to flexography, is that the artist is able to prepare an uncompensated copy of the design to be printed, the optical projector being then used to make a negative therefrom having a predetermined degree of distortion necessary to compensate for the expected distortion in the rubber printing plate to be made therefrom. While the invention is described in connection with flexography, it will be obvious that many other applications exist therefor in those situations requiring controlled optical distortion. For example in microelectronics, printed circuits are drawn on an original copy from which an etching is derived. By the use of the present invention, changes may be effected in the negative from which the etching is made without having to tamper with the original copy. Such changes may be necessary in order for instance to alter the thickness or length of a circuit connection.

For a better understanding of the invention, as well as other objects and further features thereof, reference is made to the following detailed description to be read in conjunction with the accompanying drawings, wherein:

FIG. 3 is a schematic view of the optical projector in accordance with the invention; and FIG. 4 diagrammatically illustrates the optical arrangement in the projector.

Figure 1:
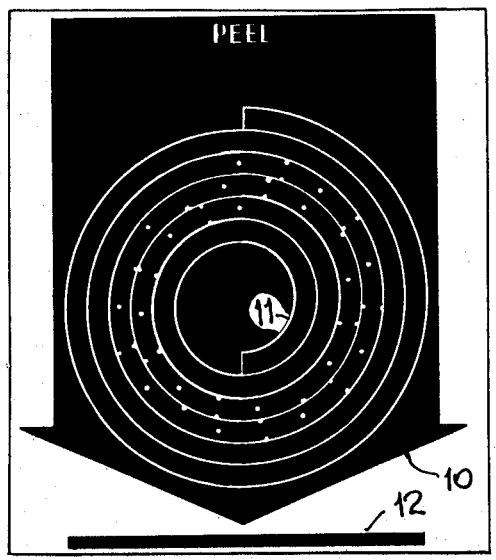
FIG. 1 is a sample of an uncompensated copy.

Referring now to FIG. 1, by way of example, we shall first consider an artist's copy from which a flexographic rubber printing plate is to be made. The copy consists of a downwardly pointed black arrow 10, within which is a white spiral 11, the arrow being labeled "PEEL." Below the arrow is a black bar 12 whose width is the same as the stem of the arrow.

As explained previously, if a rubber printing plate is made from this copy, the material printed therefrom will ordinarily not conform to the original copy, because of shrinkage encountered in the making of the plate and elongation resulting from the curved mounting thereof on the plate cylinder. It is necessary, therefore, to compensate for the anticipated distortion. This is not done by distorting the original copy in a manner balancing out the anticipated distortion, for this would involve expensive art work. The invention makes use of the uncompensated copy and introduces the desired degree of distortion in the negative derived therefrom, from which negative a master engraving is made for use in molding the matrix.

We shall assume that the compensation required in the copy shown in FIG. 1, is a particular degree of elongation in the longitudinal dimension, the lateral dimension to be kept unchanged. This is accomplished by the optical projector to be described, the result being shown in FIG. 2, where it will be seen that in the negative all of the elements in the copy are now elongated, but the lateral dimensions are unchanged. Thus the bar 12' is thicker but not wider, and the arrow 10' is elongated but not wider, as are the spiral 11' and the letters PEEL.

Referring now to FIG. 3, the optical projector in accordance with the invention comprises two cylinders 13 and 14 rotatably mounted in suitable bearings and disposed in spaced parallel relationship. The cylinders are both of the same dimensions, and in practice each cylinder may have a circumference of thirty inches. The copy 15 to be reproduced as a reproportioned negative is mounted on cylinder 13, this being done simply by taping the corners of the copy to the surface of the cylinder. A sensitive film 16 with its emulsion side exposed is similarly mounted on the cylinder 14.

As shown, both cylinders rotate in the clockwise direction. The cylinders are preferably provided with guide lines so that the leading edge of the copy occupies the same angular position on the copy cylinder as the leading edge of the film on the film cylinder. The two cylinders 13 and 14 are driven from a common motor 17, operated through a motor speed-control box 18. The armature of motor 17 is coupled through a gear box 19 having a fixed gear ratio, to the shaft of cylinder 14. Gear box 19 in turn is coupled by a suitable transmission shaft to a variable-speed gear box 20, operatively coupled to the shaft of copy cylinder 13.

Thus the speed of film cylinder 14 is controlled by varying the speed of motor 17, the gear ratio of the gear box 19 being fixed. The speed of copy cylinder 13 relative to film cylinder 14 is controlled by adjusting the gear ratio of box 20. In practice, film cylinder 14 may be operated at five inches of circumference per minute, with the copy cylinder operating plus or minus fifty percent of this speed to provide a broad range of relative speed values to effect elongation or shrinkage of the image, as desired. These speed rates are given only by way of example and depend on the parameters of the system and the results one seeks to obtain.

The image of the copy 15 is uniformly illuminated by a bank of lights represented by lamps 21, the image being projected onto film 16 on film cylinder 14 by a lens 22 mounted on a baffle 23 which is adapted to isolate the copy section of the machine from the film section. In practice, the projector is installed in a darkroom, with the only light rays penetrating the film section being those projected through lens 22.

Mounted at a fixed position, directly in front of film cylinder 14, is a planar curtain 24 having a linear slit or aperture 25 cut therein, the aperture extending in parallel relation to the longitudinal axes of the two cylinders. The slit size depends on resolution requirements of the system. In practice, a slit opening in the order of $30/1000$ of an inch is acceptable, although the invention is by no means limited to this value.

Thus the only light from the copy image projected through lens 22 which is admitted onto the film, is that passing through the narrow opening of the aperture, whereby the exposed area on the film at any instant is a line corresponding to the aperture. To prevent the transmission of stray light, a windowed curtain W may be placed in the optical path extending from the copy cylinder, the window restricting the transmission of light from the copy to a relatively narrow band.

The optical arrangement is shown diagrammatically in FIG. 4, wherein the size of the aperture 25 is exaggerated. The focal length between the image on the copy, represented by arrow I, and the lens 22, is $f_1$, and the length between lens 22 and the object projected on the film cylinder, is $f_2$, the object being represented by arrow O.

The length $f_1$, in the example illustrated in the figure, is equal to length $f_2$, so that the size of object O is the same as image I. Hence if the copy cylinder moves at a given circumferential speed and the film cylinder moves at exactly the same speed, the film will be exposed to the object through the aperture 25. The aperture will, in effect, move line by line across the film area to expose the film to the full image of the copy, the latent image on the film then exactly matching that of the copy. In order to reduce or enlarge the image across the face of the film, the focal lengths may be made adjustable. To this end the cylinders may be mounted on slide ways so as to facilitate adjustment in their positions relative to the lens.

But if the circumferential speeds of the two cylinders are different, then in the time it takes the copy cylinder to move a distance traversing the length of the copy thereon, the film cylinder will move a lesser or a greater distance, depending on whether it is slower or faster than the copy cylinder. If the film cylinder is faster, the latent image on the film will be elongated, and if slower, it will be contracted or shrunk in the direction of motion. The latent image in the longitudinal direction on the cylinder always remains constant.

Figure 2:
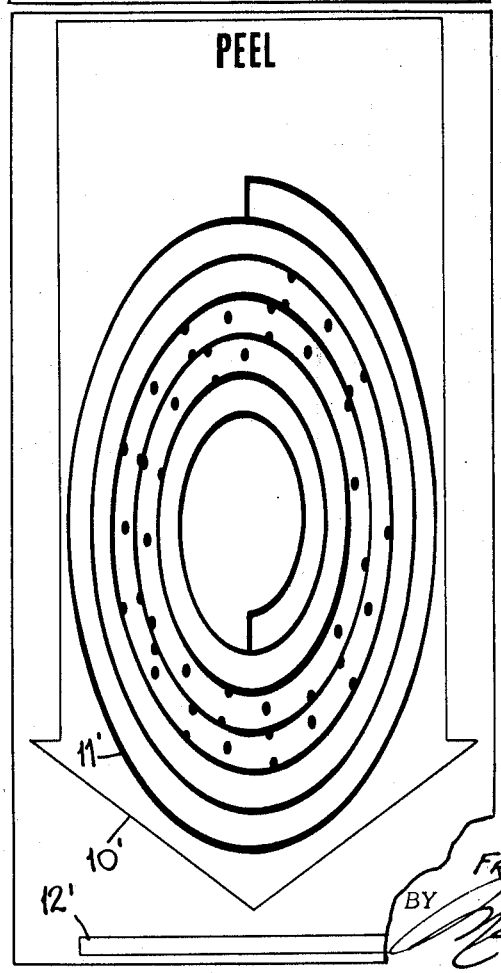
FIG. 2 is a negative made from the same copy reproportioned by an optical projector in accordance with the invention.

Thus the ratio of the lateral dimension to the longitudinal dimension on the negative may be altered with respect to that on the copy, by an adjustment of the relative speeds of the cylinders. In the case of FIGS. 1 and 2, the copy is mounted on the copy cylinder so as to elongate the longitudinal direction of the drawing. But by mounting the copy so that the longitudinal direction thereof is parallel to the axes of the cylinders, the transverse direction may be elongated.

The aperture and film cylinder operation is similar to that of a focal-plane shutter, save that in the present arrangement the aperture position is fixed and the film moves, whereas the reverse is true in a focal-plane shutter. The shutter speed or exposure time in the present arrangement depends on the rotary rate of the cylinder, and this may be adjusted in accordance with the optical parameters of the system, which depend on the nature of the copy, the amount of available light, and the film sensitivity. In practice, the speed of the film cylinder is first adjusted to provide the desired shutter speed, and the speed of the copy cylinder relative to the film cylinder is then adjusted to provide the proper degree of image reproportioning.

While there has been shown and described a preferred embodiment of optical projector for reproportioning images in accordance with the invention, it will be appreciated that many changes and modifications may be made therein without, however, departing from the essential spirit of the invention as defined in the annexed claims.

What I claim is:

1. An optical system for transferring an image from a copy having predeterminal longitudinal and transverse dimensions to a negative film in a manner reproportioning said image with respect to one of said dimensions, said system comprising:
    (a) a first rotatable cylinder for supporting the copy,
    (b) means attaching said copy to said first cylinder with the dimension thereof to be unaltered parallel to the axis of the cylinder,
    (c) a second rotatable cylinder for supporting the film, the film cylinder being disposed in parallel relationship to the copy cylinder,
    (d) baffle means fixedly interposed between the two cylinders to define a copy section which is light-insulated from a film section,
    (e) a lens at the junction of said sections to project the image from the copy onto said film,
    (f) a curtain disposed in said film section adjacent said film cylinder, said curtain having an aperture exposing a line along said film parallel to the axis of said film cylinder, whereby as said film cylinder rotates, said exposure line is effectively moved across the film, and
    (g) means to rotate said cylinders at different rates to effect a transfer of said image while reproportioning the other dimension of the copy in the image on the film to an extent determined by the relative speeds of said cylinders.

2. A system as set forth in claim 1, wherein said means for rotating said cylinder includes means to adjust the absolute speed of the second cylinder to vary the shutter speed of the system, and means to vary the speed of the first cylinder relative to the second cylinder to vary the degree to which the film image is reproportioned.

3. A system as set forth in claim 1, wherein said film cylinder is rotated at a rate resulting in a faster circumferential speed than that of said copy cylinder to effect elongation of the transferred image in one dimension only.

4. A system as set forth in claim 1, wherein said film cylinder is rotated at a rate resulting in a slower circumferential speed than that of said copy cylinder to effect contraction of the transferred image in one dimension only.

5. An optical system for transferring an image from a copy to a negative film in a manner reproportioning said image, said system comprising:
    (a) a first rotatable cylinder for supporting the copy,
    (b) a second rotatable cylinder for supporting the film, the two cylinders having the same circumference, the film cylinder being disposed in parallel relationship to the copy cylinder,
    (c) a baffle interposed between said two cylinders to define a copy section light-insulated from a film section,
    (d) means in said copy section to illuminate the copy on the copy cylinder,
    (e) a lens mounted on said baffle for projecting the image on said copy onto said film,
    (f) a curtain disposed in said film section adjacent said film cylinder, said curtain having an aperture exposing a line along the film parallel to the axis of the film cylinder whereby as the cylinder rotates the exposure line effectively moves across the film,
    (g) means to drive said cylinders at different rates to effect a predetermined change in the proportions of the copy image reproduced on the film, and
    (h) means to restrict the area of said copy viewed by said lens.

6. A system as set forth in claim 5, wherein said last-named means includes a motor, a gear box having a fixed gear ratio coupling said motor to said film cylinder, and a variable-speed gear box coupling said copy cylinder to said fixed gear box, whereby the relative speeds of the cylinders may be adjusted to effect elongation or contraction of the reproduced image.

7. A system as set forth in claim 6, further including means to vary the speed of said motor to adjust the shutter speed of the system.

8. A system as set forth in claim 5, wherein said lens forms an object of said copy image on said film in the same scale, whereby when the speeds of the cylinders are the same the image is exactly reproduced.

9. A system as set forth in claim 5, wherein said copy is a flexographic design and said negative film is used to form an engraving from which a rubber printing plate may be molded.

10. A system as set forth in claim 5, further including means to adjust the distance between at least one of said cylinders and said lens to vary one dimension of the image reproduced on said film.

References Cited

UNITED STATES PATENTS

| | | | |
|---|---|---|---|
| 1,844,162 | 2/1932 | Hirsch et al. | 88—24 |
| 2,437,255 | 3/1948 | Hogan et al. | 88—24 X |
| 2,554,507 | 5/1951 | Smith | 88—24 |
| 2,746,833 | 5/1956 | Jackson | 88—24 X |

OTHER REFERENCES

Scientific Papers of the Bureau of Standards, No. 517— A Special Camera for Photographing Cylindrical Surfaces, Dec. 5, 1925, pp. 515–526.

NORTON ANSHER, *Primary Examiner.*

W. A. SIVERTSON, *Assistant Examiner.*

U.S. Cl. X.R.

355—52